United States Patent
Wires (10) Patent No.: US 7,276,189 B2
(45) Date of Patent: Oct. 2, 2007

(54) METHOD AND COMPOSITIONS FOR MANUFACTURING PLASTIC OPTICAL LENS

(76) Inventor: Duane L. Wires, 109 S. Main St., Ada, OH (US) 45810

( * ) Notice: Subject to any disclaimer, the term of this patent is extended or adjusted under 35 U.S.C. 154(b) by 1200 days.

(21) Appl. No.: 09/741,780

(22) Filed: Dec. 19, 2000

(65) Prior Publication Data

US 2004/0131849 A1  Jul. 8, 2004

Related U.S. Application Data

(63) Continuation-in-part of application No. PCT/US99/16650, filed on Jul. 22, 1999.

(60) Provisional application No. 60/121,796, filed on Feb. 26, 1999, provisional application No. 60/104,097, filed on Oct. 13, 1998, provisional application No. 60/094,138, filed on Jul. 24, 1998.

(51) Int. Cl.
*B29C 35/08* (2006.01)
*G02B 1/04* (2006.01)
*C08F 2/50* (2006.01)
*C08F 212/06* (2006.01)
*B29D 11/00* (2006.01)

(52) U.S. Cl. .............. 264/1.1; 522/120; 522/182; 523/106; 264/496

(58) Field of Classification Search ............ 522/182, 522/183, 120; 264/1.36, 496, 1.1; 523/106
See application file for complete search history.

(56) References Cited

U.S. PATENT DOCUMENTS

| | | |
|---|---|---|
| 3,821,333 A | 6/1974 | Goodwin et al. |
| 3,881,683 A | 5/1975 | Whitney |
| 3,917,077 A | 11/1975 | Tusinski et al. |
| 3,946,982 A | 3/1976 | Calkins et al. |
| 4,085,919 A | 4/1978 | Sullivan |
| 4,132,518 A | 1/1979 | Rips |
| 4,190,621 A | 2/1980 | Greshes |
| 4,227,673 A | 10/1980 | Goodwin et al. |
| 4,251,474 A | 2/1981 | Blandin |
| 4,257,988 A | 3/1981 | Matos et al. |
| 4,441,795 A | 4/1984 | Lobdell |
| 4,474,355 A | 10/1984 | Greshes |
| 4,522,768 A | 6/1985 | Roscrow et al. |
| 4,524,035 A | 6/1985 | Neefe |
| 4,614,624 A | 9/1986 | Neefe |
| 4,623,496 A | 11/1986 | Verhoeven et al. |
| 4,645,317 A | 2/1987 | Frieder et al. |
| 4,693,446 A | 9/1987 | Orlosky |
| 4,728,469 A | 3/1988 | Danner et al. |
| 4,846,913 A | 7/1989 | Frieder et al. |
| 4,851,530 A | 7/1989 | Rickwood |
| 4,873,029 A | 10/1989 | Blum |
| 4,879,318 A | 11/1989 | Lipscomb et al. |
| 4,913,544 A | 4/1990 | Rickwood et al. |
| 4,919,850 A | 4/1990 | Blum et al. |
| 4,921,205 A | 5/1990 | Drew, Jr. et al. |
| 5,316,702 A | 5/1994 | Blum et al. |
| 5,358,672 A | 10/1994 | Blum |
| 5,364,256 A | 11/1994 | Lipscomb et al. |
| 5,406,341 A | 4/1995 | Blum et al. |
| 5,415,816 A | 5/1995 | Buazza et al. |
| 5,514,214 A | 5/1996 | Joel et al. |
| 5,516,468 A | 5/1996 | Lipscomb et al. |
| 5,523,030 A | 6/1996 | Kingsbury |
| 5,529,728 A | 6/1996 | Buazza et al. |
| 5,531,940 A | 7/1996 | Gupta et al. |
| 5,689,324 A | 11/1997 | Lossman et al. |
| 5,708,064 A | 1/1998 | Coleman et al. |
| 5,928,575 A | 7/1999 | Buazza |
| 5,969,867 A * | 10/1999 | Fukushima et al. ......... 359/581 |
| 5,976,423 A | 11/1999 | Buazza |
| 5,989,462 A | 11/1999 | Buazza et al. |
| 6,022,498 A | 2/2000 | Buazza et al. |
| 6,174,464 B1 * | 1/2001 | Garrity ............... 252/586 |
| 6,936,197 B1 * | 8/2005 | Wires ............... 264/1.38 |
| 2002/0107350 A1 * | 8/2002 | Widawski et al. ....... 526/318.4 |

FOREIGN PATENT DOCUMENTS

| | | |
|---|---|---|
| EP | 0 586 380 B1 | 5/1997 |
| EP | 0 656 827 B1 | 12/1998 |
| EP | 0 404 888 B1 | 8/1999 |
| WO | WO90/05629 | 5/1990 |
| WO | WO92/12851 | 8/1992 |
| WO | WO94/04345 | 3/1994 |
| WO | WO97/39880 | 10/1997 |
| WO | WO99/06887 | 2/1999 |

\* cited by examiner

*Primary Examiner*—Susan Berman
(74) *Attorney, Agent, or Firm*—McDonnell Boehnen Hulbert & Berghoff LLP (57) ABSTRACT

A polymerizable resin material for making a plastic lens includes bisphenol A ethoxylate (1 to 4) dimethacrylate and benzylmethacrylate, and, optionally, one or more stabilizing monomers, preferably selected from trimethylolpropane trimethacrylate, isobornyl methacrylate, ethoxylate nonyl phenol acrylate, ethyoxylate nonyl phenol, and/or 2-phenoxyethyl methacrylate esters. The polymerizable resin material is cured when exposed to heat or visible and/or UV light for a period of about two minutes or less.

30 Claims, 6 Drawing Sheets

METHOD AND COMPOSITIONS FOR MANUFACTURING PLASTIC OPTICAL LENS

RELATED APPLICATIONS

The present application is a continuation-in-part of PCT US99/16650 filed 22 Jul. 1999, still pending, which claims priority of Provisional Applications Ser. Nos. 60/094,138 filed Jul. 24, 1998; 60/104,097 filed Oct. 13, 1998 and 60/121,796 filed Feb. 26, 1999.

TECHNICAL FIELD

This invention relates, in part, to the molding of plastic optical lenses, and in particular to the molding of plastic ophthalmic lens.

BACKGROUND OF THE INVENTION

Many techniques have been developed for molding plastic lenses. Generally these techniques involve arranging two circular lens molds, known as half molds, in close alignment to form a casting cavity or opening between the two half molds. The half molds are generally made of glass and have inner surfaces which provide the desired curvature on a finished lens. A liquid resin material is inserted in the cavity and cured. Typically, the curing takes place through use of a catalyst by raising the temperature of the resin or by exposing the resin to ultraviolet light and then cooling the resin. One known polymer which has been used is a polyethylene glycol diallylcarbonate with the addition of a catalyst, for example, isopropyl percarbonate, and sold under the trademark CR39. However, the CR39 polymer when exposed to the curing process of exposure to elevated temperatures, has an undesirable shrinkage, sometimes approximately about 14%. The shrinkage causes the resin to pull away from the mold halves which allows air to enter the cavity causing damage to the lens. In certain techniques the half molds are held close alignment with a gasket. In the techniques where light is used to cure the resin, the gasket tends to block the light from curing the resin. In techniques where heat is used to cure the resin, the gasket tends to shrink during cure causing leaking of the resin or deformation of the lens being cast.

An additional drawback is that the CR39 type resins tend to take a long time, typically three hours to seventeen hours to cure. This lengthy curing time adds to the costs and time of preparation of the cast lens.

Another known material is described in the Coleman et al. U.S. Pat. No. 5,708,064 patent assigned to PPG Industries Inc. which relates to a high refractive index photochromic ophthalmic article which comprises various ingredients such as a higher fractive index imparting polymer, a plasticizer and/or a flexible monomer.

Plastic photochromatic lenses have been available in some form since the early 1980's. However, the early designs were of poor quality, and thus, have not been well accepted by the public. One type of photochromatic lens which enjoys the largest market share of photochromatic lens sales involves taking premanufactured lenses and, under pressure, injecting the photochromatic dye into the lens surface. The process allows any lens manufacturer to send lenses to the color processing company and have the lenses converted into a photochromatic lens.

In the past, monomer and dye heat cured lens processes have been unsuccessful. Photochromatic dyes by their nature become unstable when exposed to the high temperatures required to cure lenses. The dyes also tend to react with the organic peroxides used to cure lenses, creating poor quality or non-changing lenses.

In addition, in certain applications, it is desired that the lenses and other substrates, have the capability to change color. Therefore, there is a need for a photochromatic coating material that can be readily applied to a suitable substrate to allow the substrate to change color when exposed to different wavelengths of light.

The present invention is also directed to methods and compositions for coating substrates with photochromatic coating materials which are easier to make and use than prior art coating compositions and which more quickly cure than prior art compositions.

Therefore, there is a need to develop an improved method of molding lenses which does not have these problems.

Therefore, there is also a need in the lens making business for a process to prepare lenses for eye glasses which can be quickly and inexpensively manufactured.

There is a further need for a method for making lenses which can be quickly produced without causing cracking of the plastic lens, optical distortions in the lens, or discoloration of the lens.

Further, there is a further need in the lens making business for a process where the lens and the lens making materials do not undesirably shrink or prematurely separate from the mold prior to curing.

There is also a need in the lens making business for a process to prepare lenses for eye glasses which can be quickly and inexpensively colored or tinted to a customer's desired shade.

The present invention is directed to methods, apparatuses and compositions for making plastic lenses that overcome the above discussed disadvantages and drawbacks in the prior art.

SUMMARY OF THE INVENTION

The present invention provides methods, apparatuses and compositions for making plastic lenses and, in particular, for optical lenses for eye glasses.

The present invention is useful in casting prescription spheric and aspheric single vision, bifocal and progressive lenses. The present invention is also useful in casting photochromatic lenses which can be made in a multitude of shades and colors. The present invention can be practiced by the user in an office setting, which reduces costs and time of lens preparation, while allowing the user to have greater control of the lens manufacturing process.

The method of the present invention allows the user to produce thinner lenses with less peripheral distortion since lenses with an index of refraction of 1.70 can be produced. According to the method of the present invention for making plastic lenses, a UV sensitive polymerizable lens forming material is dispensed into a mold cavity. In embodiments where a photochromatic lens is desired at least one suitable photochromatic dye is added to the UV sensitive polymerizable lens forming material and mixed together prior to dispensing the lens forming material into the mold cavity.

The mold cavity is defined between a first, or front, mold member and a second, or back, mold member. The front mold and the back mold are held in a predetermined spaced apart relationship from each other by a gasket. The gasket has a desired plurality of inner edges or lips which removably seal the mold members to the gasket. A very rapidly polymerizable material is dispensed between the mold members.

The polymerizable lens forming material is exposed to visible light and/or ultraviolet light for a short period of time from about two to about four minutes. Preferably the polymerizable lens forming material is exposed to the visible and/or ultraviolet light for about two and a half minutes or less.

The front mold has a reflective inner surface to reflect the light after the light passes through the polymerizable lens forming material. The reflective inner surface of the front mold allows more light energy to be directed to the polymerizing lens forming material which, in turn allows the polymerizing material to cure more quickly. The reflective inner surface of the front mold illuminates the entire resin material, thereby eliminating any shadow problems which occur in the prior art lens casting processes. In the prior art lens casting processes where front and back transparent molds are used, shadows are created. In the prior art lens casting processes, the shadows form defects in the polymerizing plastic due to the refraction of the light as it passes through a first transparent mold, the polymer material and then a second transparent mold.

In certain aspects of the present invention, the light is diffused before it contacts the polymerizing material. The diffused light provides a uniform intensity of light exposure to the polymerizable lens forming material. The mold members can be rotated during exposure to the diffused light to further the uniformity of light energy and the exposure of the polymerizable lens forming material to the light.

In a preferred aspect, the back mold comprises a glass or other visible and UV light transparent material and the front mold comprises a reflective material which has a hard, nonvisible and non-UV light absorptive surface. In a preferred embodiment, the front mold comprises a material such as a glass or mirror coated material, nickel or stainless steel material which may be coated with a hard scratch resistant material. In an especially preferred embodiment, a nickel mold is electroplated with a carbon surface that produces a hard diamond like surface on the mold. The hard smooth surface of the front mold allows the cast lens to be readily removed after the lens is cured.

The gasket is made of a visible and ultraviolet light transparent elastomeric material that holds its shape during the curing process. The gasket does not change shape or deform when exposed to the heat generated during the curing reaction of the light on the polymerizable lens forming material. The gasket has a first, lower annularly extending lip or edge which extends circumferentially around an inner surface of the gasket. The gasket also has a second, upper annularly extending lip or edge having a predetermined height. The upper edge extends circumferentially around the inner surface of the gasket. The height or thickness of the upper edge will vary from gasket to gasket, depending on the thickness of lens which is to be cast. The back mold member is positioned in the gasket such that a lower surface of the back mold member rests on the upper edge. When the front mold member is placed in abutting relationship to the lower edge, the gasket seals around the entire circumference of the front mold member. The upper edge of the gasket holds the back mold member in a spaced apart relationship from the front mold member. The back mold member and the front mold member define a space or casting cavity which receives the polymerizable lens forming material.

Preferably a lens casting assembly is used which comprises the front mold, the gasket, and the back mold. The lens casting assembly is held in a steady position so that the polymerizable lens forming material can be dispensed in the space defined between the front mold member and the back mold member. In a preferred aspect, during dispensing of the lens forming material in the lens casting assembly, the gasket is flexed or pulled away slightly from the edge of the back mold member and the polymerizable lens forming material is dispensed into the casting cavity. The gasket is preferably sufficiently flexible to allow the polymerizable lens forming material to be dispensed while keeping the front mold in a sealing relationship with the lower annular edge of the gasket. The polymerizable lens forming material does not leak from the casting cavity due to the presence of the lower, self sealing edge of the gasket.

There is no need for adding heat or thermal energy to the casting process. Further, there is no need to cool or remove thermal energy from the polymerizable lens forming material after the lens has been cured with the visible and/or UV light.

The polymerizable lens forming material which comprises a rapidly curing a mixture of a resin material which cures upon exposure to ultraviolet light and at least one photoinitiator which absorbs both ultraviolet light and visible light.

A polymerizable resin material for making a plastic lens is disclosed. The resin material includes bisphenol A ethoxylate (1 to 4) dimethacrylate, benzylmethacrylate, and, optionally, one or more stabilizing monomers. The preferred stabilizing monomers are trimethylolpropane trimethacrylate, isobornyl methacrylate, ethoxylated nonyl phenol acrylate, 2-phenoxyethyl methacrylate esters, and/or ethoxylated nonyl phenol. Various preferred lens compositions also include other such ingredients as UV stabilizers, dye stabilizers, and, optionally, one or more photoinitiators.

The polymerizable resin material is cured when exposed to heat or visible and/or UV light for a period of two and a half minutes or less. The light is preferably within the wavelength range of about 368 to about 580 nm. The lens compositions can be cured using mercury or halogen light sources using a standard light diffuser. That is, there is no need to have special filters used to cure the lens composition of the present invention.

The present invention still further includes a photochromatic lens forming material which comprises a mixture of the polymerizable lens forming material and at least one photochromatic dye. Suitable photochromatic dyes useful in the present invention remain stable when exposed to the visible and/or UV light which cures the resin material.

The present invention also relates to a photochromatic coating composition and its use as a coating for various substrates. The photochromatic coating composition is mixed with at least one suitable medium and then is coated onto the substrate. The substrates can include such diverse articles as optical lenses, frames, and fingernails, both natural and artificial. The photochromatic coating compositions comprise at least one photochemical substance which has a induced reversible color change when exposed to different wavelengths of light, such as sunlight or ultraviolet radiation. When the light source is removed, the photochemical substance reverts back to the original color. The cycle times for color change differ depending on the medium in which the photochemical substance is dispensed.

DESCRIPTION OF THE PREFERRED EMBODIMENT

Figure 1:
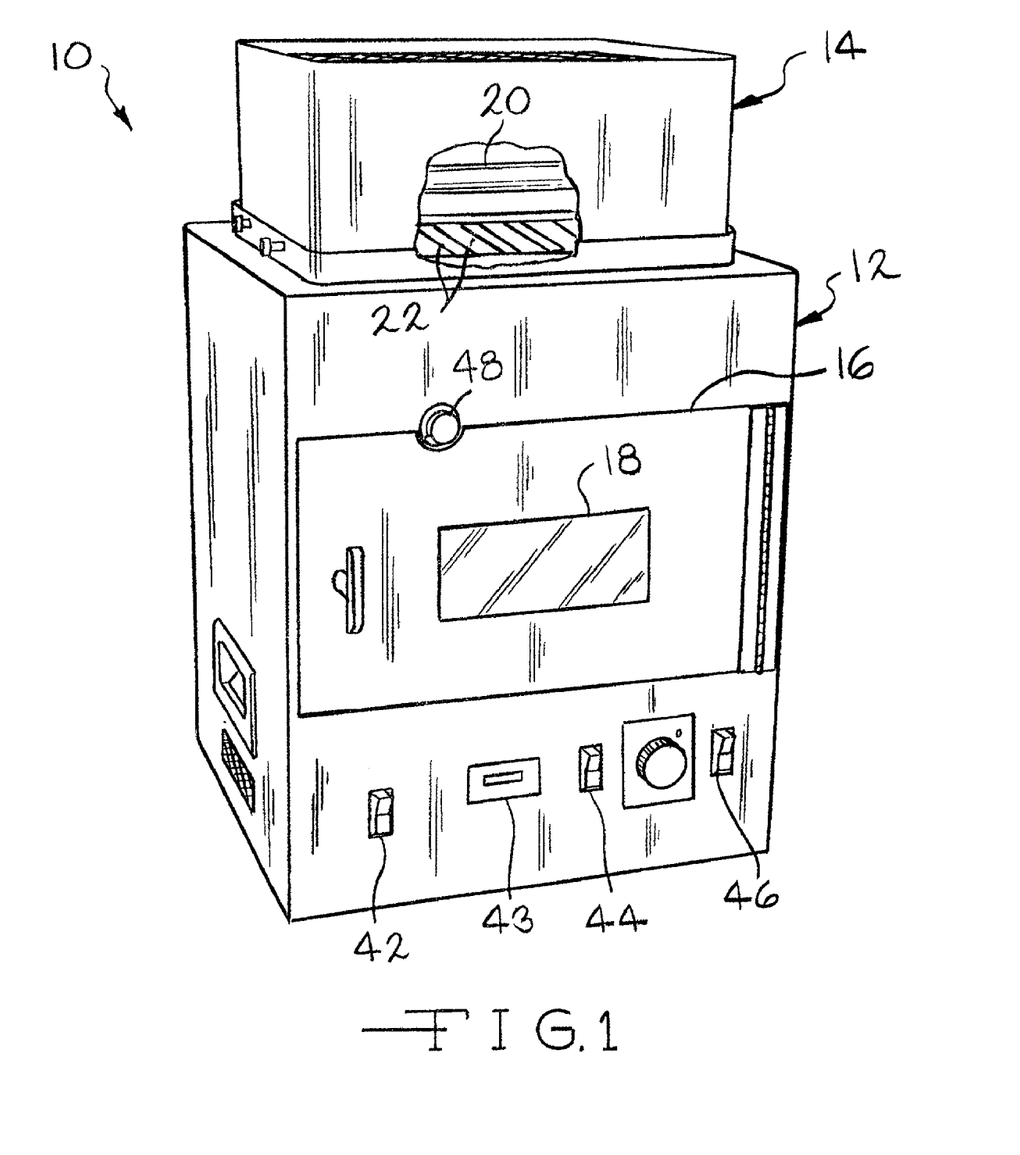
FIG. 1 is a perspective view, partially broken away, of an apparatus for producing a plastic lens.

FIG. 1 generally shows an apparatus 10 of the present invention which includes a curing chamber 12 and a lamp housing 14. The curing chamber 12 generally has a door 16 which can have a viewing window 18. Preferably, the lamp housing 14 contains a lamp 20 which produces light in both the UV and visible light spectra. In a preferred embodiment, the lamp housing 14 can have a plurality of shutters 22. However, it is also within the contemplated scope of the present invention that the lamp housing 14 can have a shutterless system using a rapid start ballast to produce ultraviolet and/or visible light exposure to the curing chamber 12 without the need for shutters.

Figure 2:
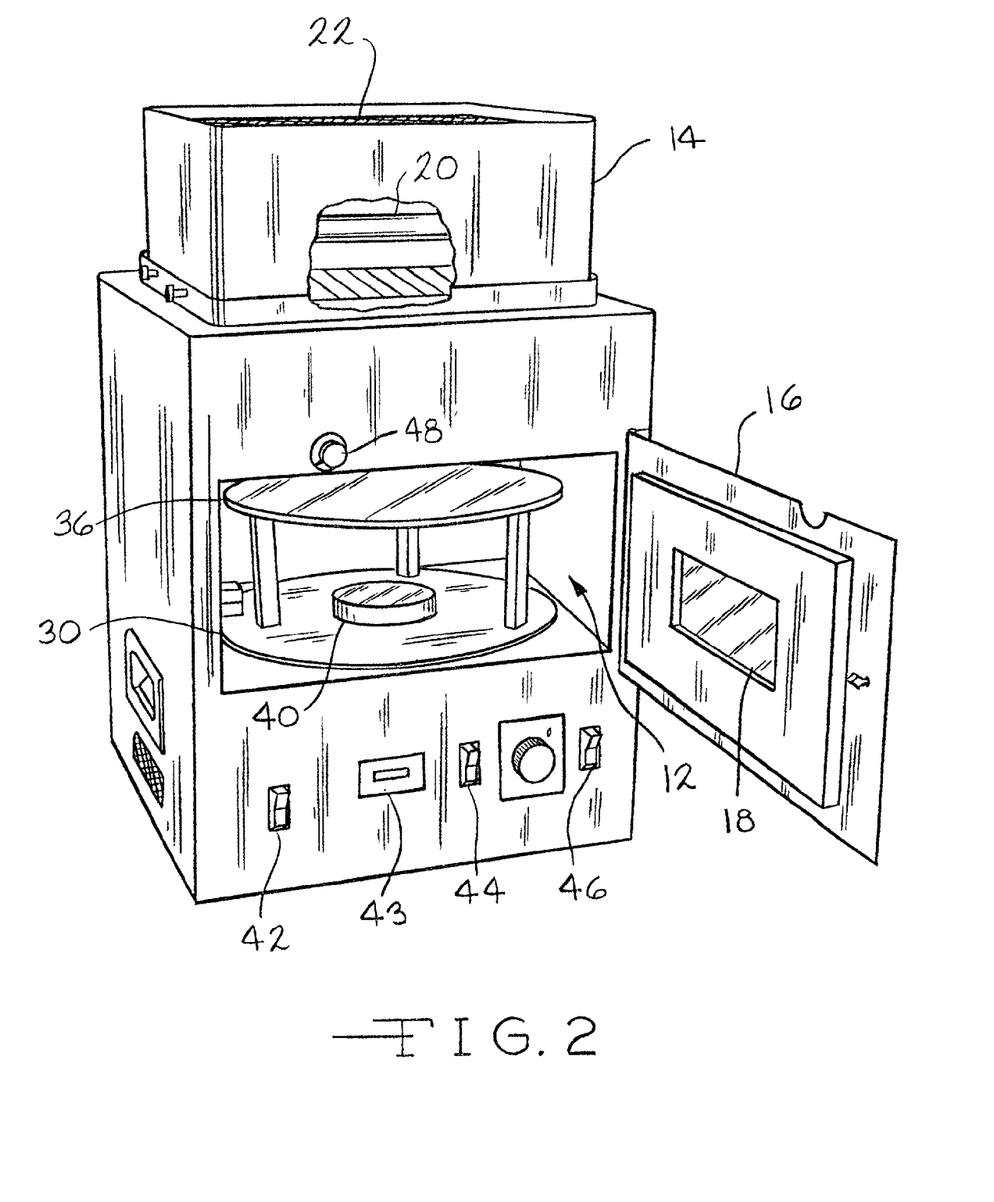
FIG. 2 is another perspective view of an apparatus for producing a plastic lens.

As shown in FIG. 2, the curing chamber 12 includes a carousel or rotating table 30 which is operatively connected to a motor (not shown) for turning the rotating table 30. In a preferred embodiment, the turntable makes between about 4 to about 6 resolutions per minute. The curing chamber 12 further includes a diffusion member or plate 36 made of a frosted glass which is removably positioned on the table 30 when the curing chamber 12 is in use.

It is to be understood that the lamp 20 preferably generates ultraviolet light having a wavelength in the range of about 300 nm to about 400 nm and also generates visible light having a wavelength in the range of about 400 nm to about 580 nm. The intensity of the light is diffused as the light passes through the diffusion plate 36. The diffusion of the light and the rotation of the lens being cured on the turn table 30 provides an overall uniform curing of the polymerizable material.

FIG. 2 shows a mold assembly 40 (which will be explained in detail below) positioned on the rotating table 30. The rotating table 30 rotates the mold assembly 40 about an axis that extends in a perpendicular direction to the plane of the lens being cast. In the operation of the lens making apparatus 10, an on/off power switch 42 is activated and an hour meter 43 is observed to determine whether certain adjustments are needed. A timer switch 44 is turned to an on position. A turn table switch 46 is moved to an on position. The shutters 22 are adjusted by moving a switch 48 from a closed to an open position. The light passes through the diffusion plate 36 and contacts the mold assembly 40, thereby allowing the rapidly curing polymerizable resin material to fully cure. The polymerizable material cures in a rapid time of less than about two minutes.

Those skilled in the art of lens making realize that lens forming materials take a long time to cure and have a tendency to shrink during cure. Accordingly, one aspect of the present invention is to provide an improved polymerizable material for lens making which does not have the drawbacks of the widely used CR39 type polymers.

According to another aspect of the present invention, the polymerizable lens forming material comprises a mixture of at least one monomer resin and at least one photoinitiator.

The polymerizable lens forming material comprises bisphenol A ethoxylate (1 to 4) dimethacrylate, about 70 to about 90%, by weight; and benzylmethacrylate (i.e., 2-propenoic acid, 2-methyl, phenylmethyl ester), of about 10 to about 20%, by weight; and, optionally, one or more stabilizing monomers. In certain aspects, the lens forming material includes one or more of the following monomers to increase stability of the product: trimethylolpropanetrimethacrylate, such as SR350 marketed by the Cray Valley Company, about 1 to about 20%, by weight; isobornyl methacrylate, such as SR423A marketed by the Cray Valley Company, about 1 to about 20%, by weight; ethoxylate nonyl phenol acrylate, such as SR504 marketed by the Cray Valley Company, about 1 to about 20%, by weight; 2-phenoxyethyl methacrylate-esters, such as SR340 marketed by the Cray Valley Company, about 1 to about 20%, by weight; and/or, ethoxylated nonyl phenol, about 1 to about 20%, by weight.

The monomer is preferably mixed with a suitable non-peroxide based photoinitiator. The preferred mixture comprises a photoinitiator which cures uniformly throughout the polymerizable mixture, rather than a photoinitiator which is a surface cure initiator only that migrates in the mixture. The photoinitiator preferably exhibits an ultraviolet absorption spectrum over about 350-400 nm range and also absorbs light in the visible spectrum. In a preferred embodiment, the photoinitiator can comprise an Irgacure® 1700 material and/or Irgacure® 184 material which are produced by the CIBA Geigy Corporation. For example, the Irgacure® 1700 material comprises about 25% bis (2,6-dimethoxybenzoyl)-2,4-,4-trimethylpentyl phosphine oxide (molecular weight, g/mole: 490.0) ($C_{26}H_{35}O_7P$) and about 25% 2-hydroxy-2-methyl-1-phenyl-propan-1-one (molecular weight, g/mole: 164.2)($C_{10}H_{12}O_2$). The Irgacure® 1700 material, when used with the polymerizable resin material, provides a very rapid rate of polymerization of less than about two minutes, and in certain embodiments, about one minute. The Irgacure® 1700 photoinitiator mixes readily with the other ingredients is stable over a five to six month period of time. It is to be understood that in certain embodiments, other photochemical initiators, including derivatives of acetophenone and benzophenone, including for example a Lucirintpo® diphenyl (2,4,6-trimethyl benzoyl), phosphine oxide material which is a photoinitiator made by the BASF Corporation can be used in the present invention.

The suitable monomer material has a very low shrinkage as compared to the CR39 material which allows the lens being cast to be completely polymerized and solidified within a period of about one to two minutes. The rotation of the lens on the turntable and the diffusion of the light as the light passes through the diffusion plate provides a cast lens with no shadows or other distortions or crazing. The lenses produced according to the method of the present invention have high uniformity and are stable and resistant to stress or fractures.

It is to be understood that various other optional ingredients can be included in the lens making composition which do not detract from the features of the lens crafting polymer composition. These and other ingredients can be used by those skilled in the art of lens making.

According to another aspect of the present invention, photochromatic lenses can be made using a mixture of the polymerizable lens forming material described herein and a photochromatic dye which is compatible with the curable resin material and the photoinitiator material. According to the present invention, the photochromatic dye is mixed into the polymerizable lens forming material prior to any curing of the lens forming material. The method of the present invention produces many colors of photochromatic lenses including red, green, blue, yellow, brown and gray. Useful photochromatic dyes include Reversacols dyes manufactured by the James Robinson Limited Company and distributed in the United States by the Keystone Aniline Corporation. The especially useful colors include Oxford Blue, Aqua Green, Sea Green, Berry Red, Flame Red, Rose Red, Plum Red, Palatinate Purple, Storm Purple, Rush Yellow and Corn Yellow.

The Reversacol type photochromatic dyes include naphthopyran type dyes such as the Berry Red, Corn Yellow and Tangerine colors which have a chromene molecule type, while the Sea Green, Plum Red, Aqua Green, Oxford Blue, Claret, Palatinate Purple, and Storm Purple colors have a spirooxazine molecule type.

In certain embodiments, a photochromatic yellow lens can be produced that is beneficial for patients requiring a blue light reduction and increased contrast. Patients with cataracts and patients participating in sports will benefit most from this tint.

A yellow lens can comprise a Reversacol Corn Yellow dye mixed in the polymerizable lens forming material in a concentration of about 0.05 to 0.2 grams per 1000 ml of lens forming material, depending on the degree of yellow required in the final activated lens.

A gray lens can comprise a mixture of Reversacol Berry Red, Sea Green, and Corn Yellow dyes in a concentration of about 0.01 to 0.2 grams per 1000 ml activated monomer.

A brown lens can comprise the gray lens formulation with an increase in Corn Yellow dye in the gray mixture.

A blue lens can comprise a mixture of Reversacol Palatine Purple, Oxford Blue and/or Storm Purple dyes in a concentration of about 0.01 to 0.2 grams of dye in 1000 ml activated monomer. This lens is a cosmetic deep blue photochromatic lens.

A red lens can comprise a mixture of Reversacol Berry Red and/or Plum Red in a concentration of about 0.01 to 0.2 grams of dye in 1000 ml activated monomer. This lens is a cosmetic deep red photochromatic lens.

A green lens can comprise a mixture of Reversacol Aqua Green and/or Sea Green dyes in a concentration of about 0.01 to 0.2 grams of dye in 1000 ml activated monomer. This lens is a cosmetic green photochromatic lens.

The photochromatic lenses are produced by adding a photochromatic dye material to the above described lens forming material. Various photochromatic dyes useful with above-described lens forming material include dyes made by PPG, Keystone/Robinson UK, and Chromtech. As another feature of the present invention, the stability and activity of the photochromatic dye can be increased with the addition of one or more dye stabilizer materials such as silane, Chromtech pH20, and/or Chromtech pH8.

In certain aspects, an UV stabilizer is added such as Tinuvin® 765 a UV light absorber of the hydroxy phenyl benzotriazole class marketed by the Ciba-Geoigy Corporation.

The method of photochromatic lens production allows the manufacturer to cast lenses directly to a patient's prescription, in a chosen color, while the patient waits, thus reducing lens inventory. Also, the photochromatic lenses do not have to be precast and sent to another manufacturer for photochromatic dye addition. It is also within the contemplated scope of the present invention that multiple color photochromatic lenses can be cast by filling the mold with layers of different colors of the photochromatic dye lens forming material.

EXAMPLES OF PHOTOCHROMATIC LENS FORMING COMPOSITIONS

Example 1

The lens composition for forming photochromatic blue lens comprises: bisphenol A ethoxylate (1 to 4) dimthacrylate about 70 to 90%, by weight; benzylmethacrylate, about 10 to about 20%, by weight; and one or more of the following stabilizing monomers: trimethlolpropane trimethacrylate, about 1 to about 20%, by weight; isobornyl methacrylate, about 1 to about 20%, by weight; ethoxylate nonylphenol, about 1 to about 20%, by weight; 2-phenoxyethyl methacrylate-esters, about 1 to about 20%, by weight; ethoxylate nonyl phenol acrylate, about 1 to about 20%, by weight.

The composition also includes one or more photochromatic dyes, about 0.001 to about 0.0001%, by weight. The composition may including additional non-photochromatic dyes in order to make bi-color lenses. Preferably the composition includes at least one photochromatic dye, about 0.01 to about 0.0001%, by weight; at least one UV stabilizer such as Tinuvin®, about 1 to about 0.1%, by weight.

The composition also preferably includes at least one or more dye stabilizers such as Chromtech PH 20, about 0.1 to 0.00001, by weight; Chromtech PH 8, about 0.1 to about 0.000001%, by weight; and/or silane 1 to 5%, by weight. The composition also preferably includes at least one photoinitator, about 1 to about 5%, by weight.

The photochromatic lens forming composition is exposed to visible light using high pressure mercury or halogen electromagnetic radiation in the wavelengths from about 368 to about 580 nanometers for a predetermined period of time.

Example 2

One preferred photochromatic blue lens composition comprises:

bisphenol A ethoxylate (1 to 4) dimethacrylate, about 85.7%, by weight;
benzylmethacrylate, about 8.58%, by weight;
trimethlolpropane trimethacrylate, about 2.6%, by weight;
Tinuvin® UV stabilizer, about 0.19%, by weight;
Chromtech Blue 475, about 0.004%, by weight;
Chromtech PH 20, about 0.0096%, by weight;
Chromtech PH 8, about 0.00096%, by weight;
Silane, about 2.9%, by weight; and
Irgacure® 1700 photoinitiator, about 0.18%, by weight.

The composition is cured by exposure to visible light using a high pressure mercury lamp for a predetermined period of time.

Example 3

One preferred example of a photochromatic orange lens composition comprises:

bisphenol A ethoxylate (1 to 4) dimethacrylate, about 85.7%, by weight;
benzylmethacrylate, about 8.58%, by weight;

trimethylolpropane trimethacrylate, about 2.6%, by weight;
Tinuvin® UV stabilizer, about 0.19%, by weight;
Chromtech Orange PH-2458, about 0.004%, by weight;
Chromtech PH 20, about 0.0096%, by weight;
Chromtech PH 8, about 0.00096%, by weight;
silane, about 2.9%, by weight;
Irgacure® 1700 photoinitiator, about 0.18%, by weight.

The composition is cured by exposure to visible light using a high pressure mercury lamp for a predetermined period of time.

Example 4

One preferred example of photochromatic purple lens composition comprises:
bisphenol A ethoxylate (1 to 4) dimethacrylate, about 85.7%, by weight;
benzylmethacrylate, about 8.58%, by weight;
ethoxylate nonylphenol, about 2.6%, by weight;
Tinuvin® UV stabilizer, about 0.19%, by weight;
Chromtech Purple 293, about 0.004%, by weight;
Chromtech PH 20, about 0.0096%, by weight;
Chromtech PH 8, about 0.00096%, by weight;
Silane, about 2.9%, by weight; and
Lucerine TPO photoinitiator, about 0.18%, by weight.

The composition is cured by exposure to visible light using a high pressure mercury lamp for a predetermined period of time.

Example 5

One preferred example of a photochromatic yellow lens composition comprises:
bisphenol A ethoxylate (1 to 4) dimethacrylate, about 85.7%, by weight;
benzylmethacrylate, about 8.58%, by weight;
ethoxylate nonylphenol, about 12.6%, by weight;
Tinuvin® UV stabilizer, about 0.19%, by weight;
Chromtech Yellow 339, about 0.004%, by weight;
Chromtech PH 20, about 0.0096%, by weight;
Chromtech PH 8, about 0.00096%, by weight;
silane, about 2.9%, by weight; and
Lucerine TPO photoinitiator, about 0.18%, by weight.

The composition is cured by exposure to visible light using a high pressure mercury lamp for a predetermined period of time.

Example 6

One preferred example of a photochromatic aqua lens composition comprises:
bisphenol A ethoxylate (1 to 4) dimethacrylate, about 85.7%, by weight;
benzylmethacrylate, about 8.58%, by weight;
Tinuvin® UV stabilizer, about 0.19%, by weight;
Chromtech Green 572, about 0.002%, by weight;
Chromtech Blue 475, about 0.002%, by weight;
Chromtech PH 20, about 0.0096%, by weight;
Chromtech PH 8, about 0.00096%, by weight;
silane, about 2.9%, by weight;
Irgacure® 184, about 0.18% photoinitiator, by weight; and
Irgacure® 1700, about 0.18% photoinitiator, by weight.

The composition is cured by exposure to visible light using a high pressure mercury lamp for a predetermined period of time.

Figure 3:
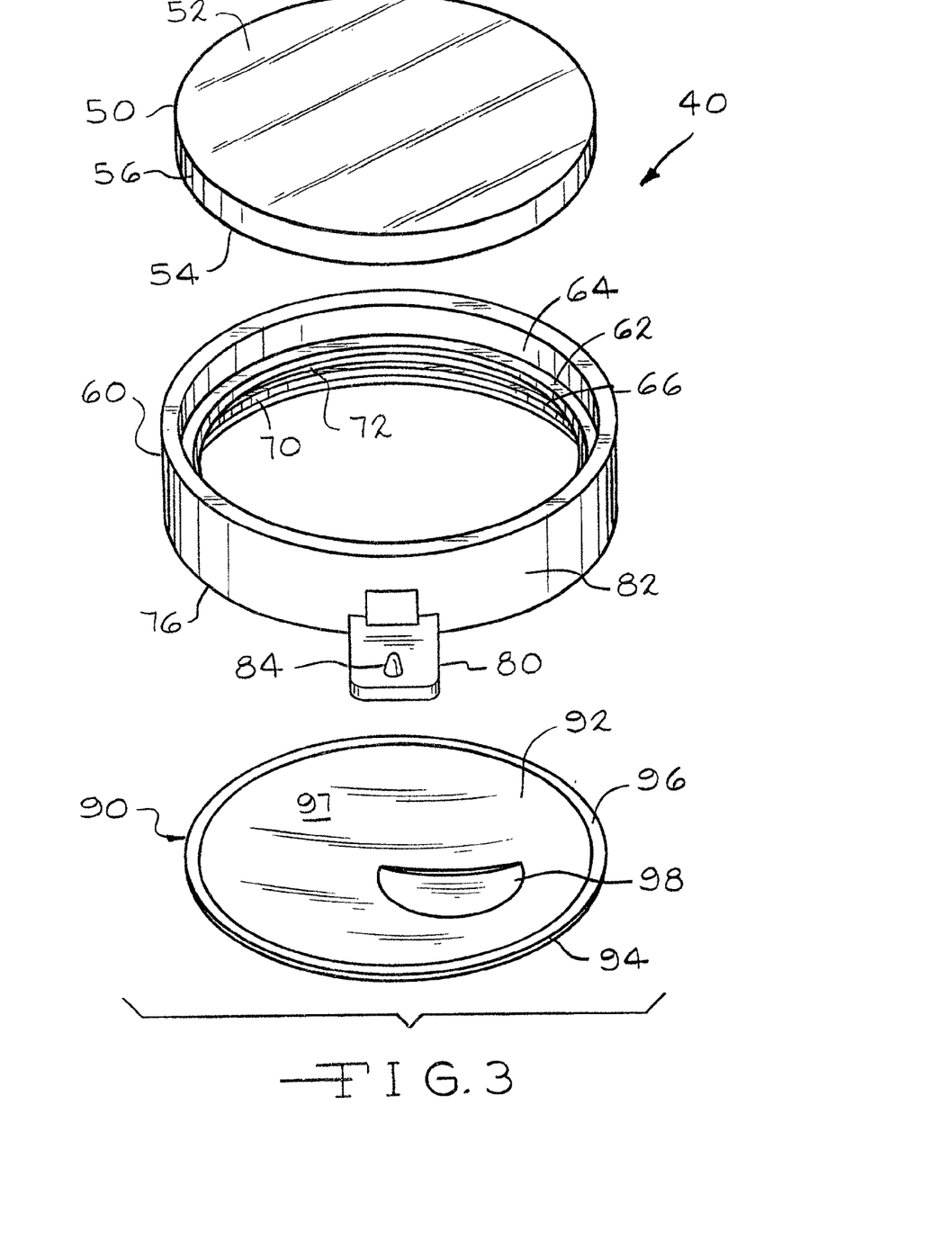
FIG. 3 is a perspective view of a lens casting mold component of the apparatus of the present invention.

Referring now to FIG. 3, the mold assembly 40 is shown in an exploded perspective view. The mold assembly 40 includes a back or top mold 50 preferably made of a glass material. The back mold 50 has an upper surface 52 and a lower surface 54. The back mold 50 has an edge 56 extending around the circumference of the back mold 50. The lower surface 54 of the back mold 50 has an optimum curvature which provides at least part of the required correction for the lens to be molded.

The lens assembly 40 further comprises a gasket 60 made of a flexible or elastomeric plastic material which is compatible with the polymerizable resin material. In the preferred embodiments, the gasket is made of a material which is ultraviolet light transparent. Suitable flexible materials which do not react with the lens casting polymers include polyvinyl chloride, soft polymethyl methacrylate and polyethylene, among others. It is to be understood that various flexible plastic materials which allow the transparency of ultraviolet light can be used with the present invention.

The gasket 60 defines an upper inner edge or lip 62 which extends in a radially inward direction circumferentially around an inner surface 64 of the gasket 60. The upper edge 62 has an annularly extending face or circumferential surface 66. The surface 66 has a desired predetermined height or depth. It is to be understood that various gaskets can have differing heights of the surface 66 so that different thicknesses of lens can be cast.

The gasket 60 defines a lower edge or lip 70 which extends in a radially inward direction around the inner surface 64 of the gasket 60. The lower edge 70 has an upper surface 72 which is in a spaced apart relationship to the upper edge 66, and a lower surface 74 which is in a spaced apart relationship to a bottom portion 76 of the gasket 60.

In various embodiments, the gasket 60 also has a tab 80 integrally molded with an outer surface 82 of the gasket 60. The tab 80 has a retaining plug or member 84 which secures the tab to a dispensing stand 100 when a polymerizable lens forming material 130 (either with or without at least one photochromatic dye) is being injected between the back mold member 50 and a front mold member 90, as will be explained in detail below.

The lens assembly 40 further comprises a front or bottom mold 90 which preferably is made of a metal material. The front mold 90 has an upper or inner surface 92 and a lower surface 94. The front mold 90 has a flat beveled rim or edge 96. In a preferred embodiment the front mold 90 is made of a nickel material which is electrocoated with a diamond like carbon coating 97. In certain preferred embodiments, when bifocal lens are to be casted, the front mold 90 can have a bifocal segment 98 on the inner surface 92.

When assembled in the gasket 60, the front mold member 90 and the back mold 50 define a cavity 78 which receives the polymerizable resin material 130. It is understood by those skilled in the art that the dimensions of the cavity 78 determine the shape of the lens to be cast.

Figure 4:
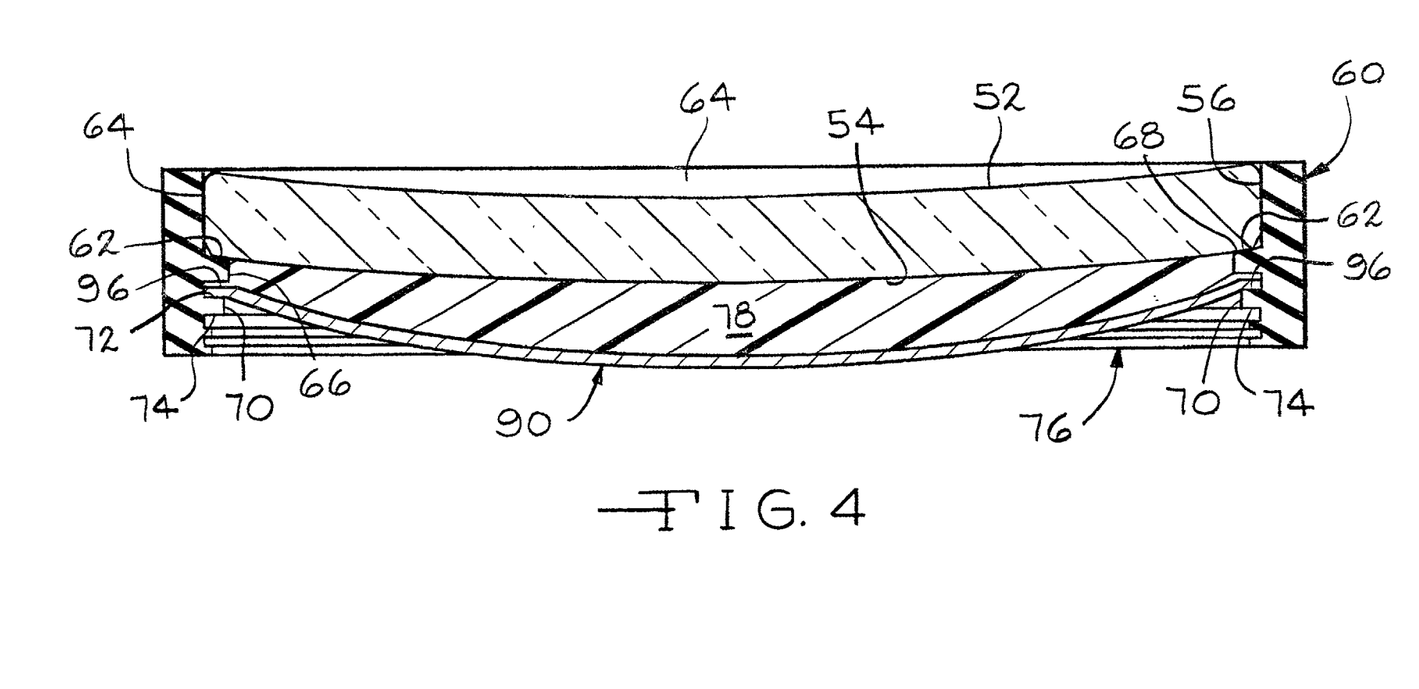
FIG. 4 is a cross-sectional view of a lens casting mold component for use in the apparatus of the present invention.
Figure 6:
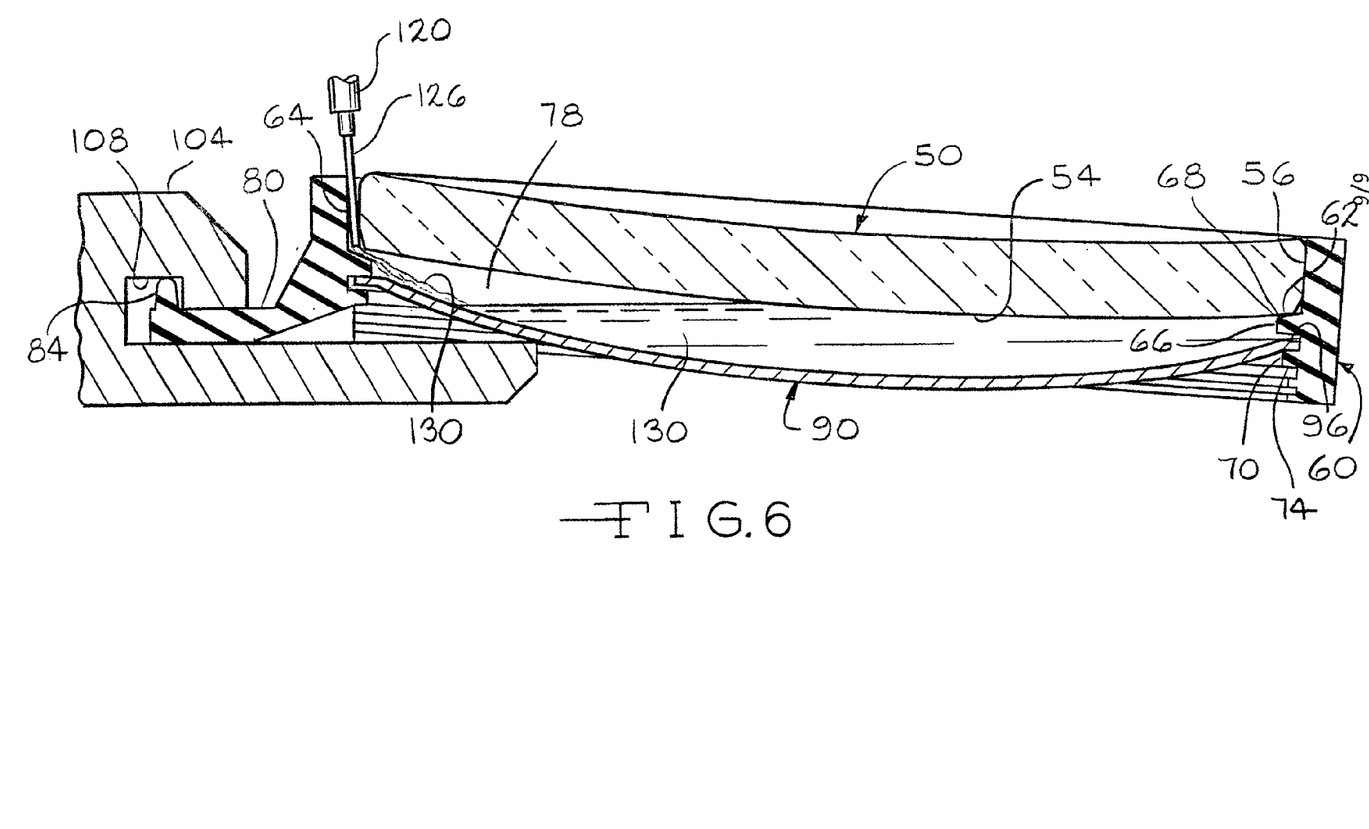
FIG. 6 is a cross-sectional view of a lens casting mold component being filled with a UV light curing polymer material while being held in the resin dispensing apparatus.

Referring now to FIGS. 4 and 6, the mold assembly 40 is shown ready to accept the resin material 130. The front mold 90 is positioned in the gasket 60. The beveled edge 96 of the front mold 90 is positioned on the upper surface 72 of the lower lip or edge 70. The flat beveled surface 96 of the front mold 90 is engaged in the space between the upper edge 62 and the lower edge 70. The lower edge 70 holds the front mold 90 in a secure position in the gasket 60.

The back mold 50 is placed in the gasket 60. The lower surface 54 of the top mold 50 is adjacent an upper surface 68 of the upper edge 62. The circumferential surface 56 of the back mold 50 is secured against the inner surface 64 of the gasket 60.

Figure 5:
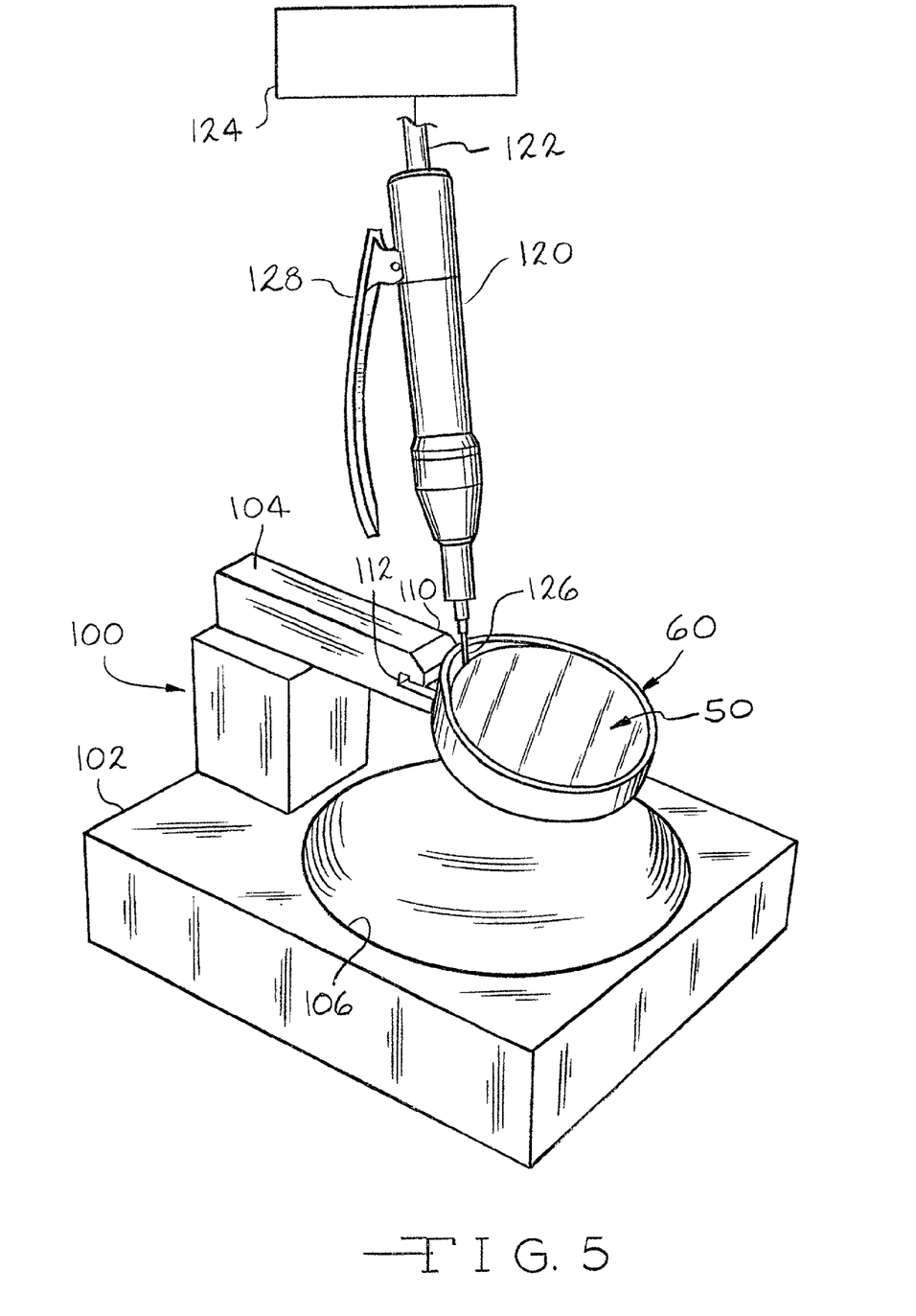
FIG. 5 is a perspective view of a resin dispensing apparatus and the lens casting mold component.

Referring to FIG. 5 now, the dispensing stand 100 is generally shown. The dispensing stand 100 has a base 102 and a support arm 104 in a spaced apart relationship to the base 102. In a preferred embodiment the base 102 of the dispensing stand 100 defines a well 106 for receiving any excess resin material. The supporting arm 104 has a first or distal end 110 in a spaced apart relationship to the base 102.

The distal end 110 defines an opening 112 for slideably receiving the tab 80 of the gasket 60.

A dispensing pen 120 is used to dispense a predetermined amount of the polymerizable resin material 130 into the mold assembly 40. The dispensing pen 120 is attached by a tube 122 to a pressurized container 124 in a manner which is well known in the art. The dispensing pen 120 has a tip 126 which allows the polymerizable resin material 130 to be accurately dispensed. In the embodiment shown, a handle 128 is retracted or squeezed by the user to dispense a predetermined amount of the polymerizable resin material 130. As shown in FIG. 6, the gasket 60 is stretched or flexed and the tip 126 is placed adjacent the side wall 64 of the gasket 60 in a manner such that the polymerizable resin material 130 flows into the cavity 78 defined between the front mold 90 and the back mold 50. The front mold 90 is held securely in position in the gasket 60 by the lower edge 70 of the gasket 60. The polymerizable resin material 130 flows to the circumferential surface 66 of the upper lip or edge 62 such that the polymerizable resin material 130 substantially completely fills the cavity 78.

After the polymerizable resin material 130 substantially fills the cavity 78, the mold assembly 40 is slideably removed from the opening 112 in the stand 100. It is to be understood that in certain embodiments a dispensing stand is not needed. The dispensing tip 126 can be inserted between the circumferential edge 64 of the gasket 60 and the circumferential edge 56 of the back mold 50 simply by flexing one edge of the gasket 60 in a direction away from back mold 50.

After the mold assembly 40 is filled with the polymerizable resin material 130, the mold assembly 40 is placed in the curing chamber 12 and is cured in a manner as described above.

After the polymerizable resin material 130 is cured, the user 10 removes the gasket 60 and applies pressure to at least a portion of an edge of the cast lens, which allows the lens to be released from the front mold 90 and the back mold 50.

In other embodiments, it is possible to use a precast front or add plate to make polycarbonate lenses or to make lenses with photochromatic, antireflective, or antireflective photochromatic features.

It is to be further understood that front molds can be formed such that bifocal or progressive lenses can also be cast by using the method and apparatus of the present invention.

Another aspect of the present invention relates to coating a substrate with a photochromatic coating material to produce an article that changes color when exposed to different wavelengths of light. It is within the contemplated scope of the present invention that the photochromatic dye compositions discussed above are useful in preparing the photochromatic coating composition. According to a preferred method, the photochromatic dyes are mixed with a suitable medium and coated onto the substrate.

In one embodiment, the photochromatic dyes are mixed with a suitable medium and coated onto at least one surface of an optical lens material, such as the optical lenses described above. However, it is also within the contemplated scope of the present invention that other types of optical lenses can be coated with the photochromatic composition to produce lenses which change color.

In another embodiment, at least one of the photochromatic dyes is added to a suitable base medium to make a photochromatic fingernail polish. In preferred embodiments, the photochromatic dyes are added at concentrations ranging from about 0.001% to about 0.1%, by weight, to a suitable base medium. Various suitable base media include, but are not limited to cyclomethicone, mineral oil, ethyl acetate, isopropyl alcohol, butyl acetate, propyl acetate, acrylates copolymer, epoxy resin, nitrocellulose, cellulose acetate butyrate, etocrylene benzophenone-1, isostearoyl hydrolyzed keratin, panthenol, n-butyl alcohol, polyester resin, formaldehyde resin, and the like. The coating composition can be cured by exposure to ultraviolet radiation for a rapid cure, or by exposure to air.

Having described the invention above, various changes from the specific materials, procedures and apparatus will occur to those skilled in the art. It is intended that all such variations are within the scope and spirit of the appended claims.

I claim:

1. A light polymerizable resin material consisting essentially of, based on a total of 100% by weight, exclusive of photoinitiator, bisphenol A ethoxylate (1 to 4) dimethacrylate, about 70 to about 90%, by weight;

benzylmethacrylate, about 10 to about 20%, by weight;

one or more stabilizing monomers, about 1 to 10% by weight, the stabilizing monomers being selected from the group consisting of trimethylolpropane trimethacrylate, isobornyl methacrylate, ethoxylate nonyiphenol, 2-phenoxyethyl methacrylate-esters, ethoxylate nonyl phenol acrylate;

optionally one or more photochromatic dyes;

optionally one or more UV stabilizers;

optionally one or more dye stabilizers; and one or more photoinitators.

2. The polymerizable resin material of claim 1, wherein the one or more stabilizing monomers include at least one of trimethylolpropane trimethacrylate and ethoxylated nonyl phenol acrylate.

3. The polymerizable resin material of claim 1, wherein the resin material includes at least one photochromatic dye.

4. The polymerizable resin material of claim 1, wherein the photoinitator is not peroxide-based.

5. The polymerizable resin material of claim 1, wherein the resin material includes at least one dye stabilizer.

6. The polymerizable resin material of claim 1, wherein the resin material includes at least one UV stabilizer.

7. The polymerizable resin material of claim 1, wherein the resin material is cured when exposed to light in the wavelength range of about 368 to about 580 nm.

8. The polymerizable resin material of claim 7, wherein the resin material is cured when exposed to light for a period of time of about two and a half minutes or less.

9. The polymerizable resin material of claim 1 wherein the material includes one or more photochromatic dyes, one or more UV stabilizers, and one or more dye stabilyzer.

10. The polymerizable resin material of claim 9, consisting essentially of, based on a total of 100% by weight, exclusive of photoinitiator, bisphenol A ethoxylate (1 to 4) dimethacrylate, about 85.7%, by weight; benzylmethacrylate, about 8.58%, by weight; one or more of the stabilizing monomers, about 2.6%, by weight; UV stabilizer; and one or more photochromatic dyes; and one or more dye stabilizers.

11. The polymerizable resin material of claim 9, consisting essentially of, based on a total of 100% by weight, exclusive of photoinitiator, bisphenol A ethoxylate (1 to 4) dimethacrylate, about 85.7%, by weight; benzylmethacrylate, about 8.58%, by weight; trimethyloipropane trimethacrylate, about 2.6%, by weight; UV stabilizer, about 0.19%, by weight; one or more photocliromatic dyes, about 0.004%, by weight %; and one or more dye stabilizers, about 2.91056%, by weight.

12. The polymerizable resin material of claim 9, consisting essentially of, based on a total of 100% by weight, exclusive of photoinitiator, bisphenol A ethoxylate (1 to 4) dimethacrylate, about 85.7%, by weight; benzylmethacrylate, about 8.58%, by weight; ethoxylate nonyiphenol, about 2.6%, by weight; UV stabilizer, about 0.19%, by weight; one or more photoebromatic dyes, about 0.004%, by weight; and one or more dye stabilizers, about 2.91056%, by weight.

13. A method for making a plastic lens comprising
   providing a front mold having a reflective, non-visible and non-ultraviolet (UV) absorptive inner surface;
   providing a back mold which is light transmissive;
   disposing the front mold and the back mold in a light transparent gasket, the gasket defining a lower inner edge for removably sealing the front mold to the gasket, the gasket further defining an upper inner edge for holding the back mold in a spaced apart relationship to the lower inner edge, the space between the upper and lower inner edges defining a lens forming cavity when the front mold and the back mold are positioned in the gasket;
   the lower inner edge of the gasket extending in a radially inward direction around an inner surface of the gasket, the lower inner edge having an upper surface which is in a spaced apart relationship to the upper inner edge wherein the front mold is removably sealed within and is held in position in the gasket by the lower inner edge;
   dispensing a predetermined quantity of a curable lens forming resin material according to claim 1 in the lens forming cavity; and,
   exposing the dispensed resin material in the lens forming cavity to a source of heat visible and/or UV light for a predetermined length of time at a predetermined intensity to cure the resin material without the need for cooling the resin material.

14. The method of claim 13, in which the one or more stabilizing monomers include trimethylolpropane trimethacrylate or ethoxylated nonyl phenol.

15. The method of claim 13, in which the resin material is exposed to light in the range of about 368 to about 580 nm.

16. The method of claim 15, in which the resin material is cured for a period of time of about two and a half minutes or less.

17. The method of claim 13, in which the light passes through a diffusion member before the light passes through and cures the lens forming resin material.

18. The method of claim 17, in which the resin material in the lens forming cavity is rotated about an axis extending perpendicular to the plane of the lens during the curing of the lens forming resin material.

19. The method of claim 13, in which the front mold comprises a nickel material coated with a hard carbon surface.

20. The method of claim 13, in which the back mold comprises a transparent glass material.

21. The method of claim 13, in which the lens forming resin material is exposed to heat or visible and/or UV light for a period of two and a half minutes or less.

22. The method of claim 13, in which the gasket is removed, exposing the edge of the cured lens material and a force is applied at least a portion of an edge of the front and/or back molds to remove the lens from the front and back molds.

23. The method of claim 13, in which the resin material includes at least one photochromatic dye material.

24. The method of claim 13, in which the photoinitator is not peroxide-based.

25. The method of claim 13, in which the resin material includes at least one UV stabilizer.

26. The method of claim 13, in which the resin material includes at least one dye stabilizer.

27. The method of claim 13, in which the resin material comprises one or more photochromatic dyes, one or more UV stabilizers, and one or more dye stabilizers.

28. The method of claim 13, in which the resin material consists essentially of, based on a total of 100% by weight, exclusive of photoinitiator, bisphenol A bisphenol A ethoxylate (1 to 4) dimethacrylate, about 85.7%, by weight; benzylmethacrylate, about 8.58%, by weight; one or more of the stabilizing monomers, about 2.6%, by weight; UV stabilizer; one or more photochromatic dyes; and one or more dye stabilizers.

29. The method of claim 13, in which the resin material: consists essentially of, based on a total of 100% by weight, exclusive of photoinitiator, bisphenol A ethoxylate (1 to 4) dimethacrylate, about 85.7%, by weight; benzylmethacrylate, about 8.58%, by weight; trimethyloipropane trimethacrylate, about 2.6%, by weight; UV stabilizer, about 0.19%, by weight; one or more photochromatic dyes, about 0.004%, by weight %; and one or more dye stabilizers, about 2.91056%, by weight.

30. The method of claim 13, in which the resin material consists essentially of, based on a total of 100% by weight, exclusive of photoinitiator, bisphenol A ethoxylate (1 to 4) dimethacrylate, about 85.7%, by weight; benzylmethacrylate, about 8.58%, by weight; ethoxylate nonylphenol, about 2.6%, by weight; UV stabilizer, about 0.19%, by weight; one or more photochromatic dyes, about 0.004%, by weight; one or more dye stabilizers, about 2.91056%, by weight.

* * * * *